(12) United States Patent
Toyoshima et al.

(10) Patent No.: US 12,110,426 B2
(45) Date of Patent: Oct. 8, 2024

(54) ULTRAVIOLET RAY-CURABLE SILICONE ADHESIVE AGENT COMPOSITION, AND METHOD FOR PRODUCING LAMINATE

(71) Applicant: SHIN-ETSU CHEMICAL CO., LTD., Tokyo (JP)

(72) Inventors: Takeharu Toyoshima, Annaka (JP); Atsushi Yaginuma, Annaka (JP); Toshiyuki Ozai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 447 days.

(21) Appl. No.: 17/425,100

(22) PCT Filed: Nov. 26, 2019

(86) PCT No.: PCT/JP2019/046181
§ 371 (c)(1),
(2) Date: Jul. 22, 2021

(87) PCT Pub. No.: WO2020/158134
PCT Pub. Date: Aug. 6, 2020

(65) Prior Publication Data
US 2022/0106506 A1 Apr. 7, 2022

(30) Foreign Application Priority Data
Jan. 28, 2019 (JP) .................................. 2019-012009

(51) Int. Cl.
*C09J 183/04* (2006.01)
*C08G 77/08* (2006.01)
*C08G 77/12* (2006.01)
*C08G 77/20* (2006.01)
*C08J 7/12* (2006.01)
*C08G 77/14* (2006.01)

(52) U.S. Cl.
CPC ............ *C09J 183/04* (2013.01); *C08G 77/08* (2013.01); *C08G 77/12* (2013.01); *C08G 77/20* (2013.01); *C08J 7/123* (2013.01); *C08G 77/14* (2013.01); *C09J 2301/416* (2020.08)

(58) Field of Classification Search
CPC ................................. C08J 3/28; H01L 23/296
See application file for complete search history.

(56) References Cited

U.S. PATENT DOCUMENTS 4,087,585 A * 5/1978 Schulz ..................... C08L 83/08
428/447
5,194,649 A * 3/1993 Okawa ...................... C07F 7/12
556/451
8,207,442 B2 * 6/2012 Woods ................ H01L 31/0749
136/255

2010/0256300 A1 10/2010 Jandke et al.
2013/0200554 A1 * 8/2013 Mueller .................. C08L 83/04
525/478
2015/0124338 A1 5/2015 Mayumi et al.

FOREIGN PATENT DOCUMENTS

| JP | 2002-322363 A | 11/2002 |
| JP | 2010-242087 A | 10/2010 |
| JP | 2015-110752 A | 6/2015 |
| JP | 2015-214637 A | 12/2015 |

OTHER PUBLICATIONS

English Translation of the Written Opinion in PCT/JP2019/046181 (Year: 2019).*
International Search Report, issued in PCT/JP2019/046181, PCT/ISA/210, dated Feb. 10, 2020.
Written Opinion of the International Searching Authority, issued in PCT/JP2019/046181, PCT/ISA/237, dated Feb. 10, 2020.

* cited by examiner

*Primary Examiner* — Marc S Zimmer
(74) *Attorney, Agent, or Firm* — Birch, Stewart, Kolasch & Birch, LLP

(57) ABSTRACT

An ultraviolet ray-curable silicone adhesive agent composition comprising
(A) a polysiloxane represented by formula (1):

$(R^1SiO_{3/2})_{a1}(R^1{}_3SiO_{1/2})_{b1}(X^1O_{1/2})_{c1}$ (wherein $R^1$ represents a monovalent hydrocarbon group wherein a methyl group accounts for 20 mol % or more and an alkenyl group accounts for 0.1 to 50 mol %; $X^1$ represents a hydrogen atom or the like; a1 represents 0.1 to 1; b1 represents 0 to 0.75; and c1 represents 0 to 0.1; and the requirement represented by the formula: a1+b1+c1=1 is satisfied),
(B) a polysiloxane represented by formula (2):

$(R^2{}_3SiO_{1/2})_{a2}(R^2{}_2SiO)_{b2}$ (wherein $R^2$ represents a monovalent hydrocarbon group wherein a methyl group accounts for 20 mol % or more and an alkenyl group accounts for 0.01 to 25 mol %; a2 represents 0.001 to 0.67; b2 represents 0.33 to 0.999; and the requirement represented by the formula: a2+b2=1 is satisfied),
(C) a hydrogen polysiloxane represented by formula (3):

$R^3{}_dH_eSiO_{[(4-d-e)/2]}$ (wherein $R^3$ represents a monovalent hydrocarbon group; and d and e represent numerical values satisfying the requirements represented by the formulae: 0.7≤d≤2.5, 0.01≤e≤1.0 and 0.8≤d+e≤2.7) and
(D) a platinum-group catalyst capable of being activated with light having a wavelength of 200 to 500 nm.
The ultraviolet ray-curable silicone adhesive agent composition can provide a cured article having excellent adhesion force to an object of interest even when being cured under room temperature.

5 Claims, No Drawings

ULTRAVIOLET RAY-CURABLE SILICONE ADHESIVE AGENT COMPOSITION, AND METHOD FOR PRODUCING LAMINATE

TECHNICAL FIELD

The present invention relates to an ultraviolet-curable silicone adhesive composition and a method for producing a laminate.

BACKGROUND ART

Ultraviolet addition-curable silicone adhesives are silicone materials which, when irradiated with ultraviolet light, gradually cure and adhere to a substrate (member) even at room temperature. This is because a photoactive platinum catalyst included in the material, upon exposure to UV irradiation, changes to a high activity state for crosslinking reactions. At this time, the platinum catalyst, with merely a single exposure to UV irradiation, maintains a high activity state and promotes curing of the liquid material. Such a material system is thus particularly effective when the aim is to mutually bond opaque members through which light does not pass.

Simple steps in laminating together and bonding two members using a UV addition-curable silicone adhesive include, first of all, applying a liquid coating composed of the adhesive composition to one of the members, irradiating the applied material with an effective dose of UV light to promote curing of the material, and then superimposing the other member onto the layer of adhesive that is in a liquid or semi-cured state.

However, a sufficient adhesion to the substrate has not been obtained with conventional UV addition-curable silicone adhesives, particularly when curing is carried out at room temperature.

Patent Document 1 does report that by including a large amount of hydrosilane in a silicone adhesive, the bonding effect when used on polybutylene terephthalate (PBT) or polyamide (PA) can be enhanced. However, when surplus of hydrosilyl groups are present in an addition-curable silicone material, dehydrogenation reactions readily arise as side reaction to the crosslinking reaction by the platinum catalyst, as a result of which bubbles form within the resin and become points of rupture that greatly diminish the resin strength and lower the adhesive strength.

PRIOR ART DOCUMENTS

Patent Documents

Patent Document 1: JP-A 2010-242087

SUMMARY OF INVENTION

Technical Problem

In light of the above circumstances, the object of the invention is to provide an ultraviolet-curable silicone adhesive composition which, even when curing is carried out at room temperature, gives a cured material that exhibits an excellent adhesive force to an adherend.

Solution to Problem

The inventors have conducted extensive investigations aimed at achieving this object. As a result, they have discovered that an ultraviolet-curable silicone adhesive composition containing components (A) to (D) below, even when cured at room temperature, gives a cured material which exhibits an excellent adhesive force. This discovery ultimately led to the present invention.

Accordingly, the present invention provides:

1. An ultraviolet-curable silicone composition which includes:

(A) a branched organopolysiloxane represented by average unit formula (1) below $$(R^1SiO_{3/2})_{a1}(R^1{}_3SiO_{1/2})_{b1}(X^1O_{1/2})_{c1} \quad (1)$$

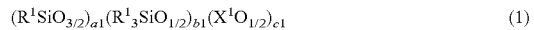

(wherein each $R^1$ is independently a substituted or unsubstituted monovalent hydrocarbon group, with at least 20 mol % of the occurrences of $R^1$ being methyl groups and from 0.1 to 50 mol % being alkenyl groups; $X^1$ is a hydrogen atom or an alkyl group, a1 is a number from 0.1 to 1, b1 is a number from 0 to 0.75, c1 is a number from 0 to 0.1, and a1+b1+c1=1);

(B) a linear organopolysiloxane represented by average unit formula (2) below $$(R^2{}_3SiO_{1/2})_{a2}(R^2{}_2SiO)_{b2} \quad (2)$$

(wherein each $R^2$ is independently a substituted or unsubstituted monovalent hydrocarbon group, with at least 20 mol % of the occurrences of $R^2$ being methyl groups and from 0.01 to 25 mol % being alkenyl groups; a2 is a number from 0.001 to 0.67, b2 is a number from 0.33 to 0.999; and a2+b2=1) in an amount of from 0 to 5,000 parts by weight per 100 parts by weight of component (A);

(C) an organohydrogenpolysiloxane of average compositional formula (3) below that has at least two Si—H groups per molecule $$R^3{}_dH_eSiO_{[(4-d-e)/2]} \quad (3)$$

(wherein each $R^3$ is independently a substituted or unsubstituted monovalent hydrocarbon group exclusive of aliphatic unsaturated hydrocarbon groups, and 'd' and 'e' are numbers which satisfy the conditions $0.7 \leq d \leq 2.5$, $0.01 \leq e \leq 1.0$ and $0.8 \leq d+e \leq 2.7$) in an amount such that the molar ratio of hydrosilyl groups included in component (C) to alkenyl groups included in components (A) and (B), expressed as hydrosilyl/alkenyl, is from 0.8 to 2.0; and (D) a platinum metal catalyst that is activated by light having a wavelength of between 200 and 500 nm;

2. The ultraviolet-curable silicone composition of 1 above, wherein $R^1$ is a monovalent hydrocarbon group of 1 to 3 carbon atoms;

3. The ultraviolet-curable silicone composition of 1 or 2 above, wherein at least 80 mol % of the occurrences of $R^1$ are methyl groups and the balance are vinyl groups;

4. The ultraviolet-curable silicone adhesive composition of any of 1 to 3 above, wherein component (D) is an ($\eta^5$-cyclopentadienyl)tri(aliphatic)platinum compound or a bis(β-diketonato)platinum compound;

5. The ultraviolet-curable silicone adhesive composition of any of 1 to 4 above, further including (E) a compound having at least one moiety selected from the group consisting of (meth)acrylic, carbonyl, epoxy, alkoxysilyl and amide moieties per molecule; and 6. A method for producing a laminated body which has a first substrate, a second substrate superimposed on the first substrate and an intervening adhesive layer obtained using the adhesive composition of any of 1 to 5 above, which method includes the steps of coating the adhesive composition onto a surface of the first substrate; irradiating the adhesive composition with ultraviolet light; curing the adhesive composition to form an adhesive layer; and superimposing the second substrate on the adhesive composition or adhesive layer and laminating together the first and second substrates through the adhesive composition or adhesive layer.

Advantageous Effects of Invention

The ultraviolet-curable silicone adhesive composition of the invention cures under mild conditions of between about 20° C. and about 80° C. to give a cured material which has excellent adhesion to a substrate. The ultraviolet-curable silicone adhesive composition of the invention having such a quality can be suitably used in the lamination of optical devices, displays, touch panels and the like.

DESCRIPTION OF EMBODIMENTS

The present invention is described in detail below.
(1) Component (A)
Component (A) in the ultraviolet-curable silicone adhesive composition of the invention is an organopolysiloxane represented by average unit formula (1) below.

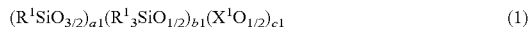
$(R^1SiO_{3/2})_{a1}(R^1{}_3SiO_{1/2})_{b1}(X^1O_{1/2})_{c1}$ (1)

In formula (1), each $R^1$ is independently a substituted or unsubstituted monovalent hydrocarbon group, with at least 20 mol % of the occurrences of $R^1$ being methyl groups and from 0.1 to 50 mol % being alkenyl groups.

The monovalent hydrocarbon group $R^1$ is exemplified by alkyl groups, aryl groups and alkenyl groups.

The alkyl groups may be linear, branched or cyclic, and the number of carbon atoms thereon, although not particularly limited, is preferably from 1 to 12, and more preferably from 1 to 6.

Specific examples of alkyl groups include substituted or unsubstituted alkyl groups, including linear or branched alkyl groups such as methyl, ethyl, n-propyl, isopropyl, n-butyl, sec-butyl, tert-butyl, n-pentyl, n-hexyl and n-heptyl groups; cycloalkyl groups such as the cyclohexyl group; and halogenated alkyl groups such as chloromethyl, 3-chloropropyl and 3,3,3-trifluoropropyl groups. Of these, from the standpoint of heat resistance, a methyl group is preferred.

The number of carbon atoms on the aryl groups, although not particularly limited, is preferably from 6 to 20, and more preferably from 6 to 10.

Specific examples of aryl groups include unsubstituted or alkyl-substituted aryl groups such as phenyl, naphthyl, tolyl, xylyl and mesityl groups; and halogen-substituted aryl groups such as the chlorophenyl group. Of these, a phenyl group is preferred.

The alkenyl groups may be linear, branched or cyclic. The number of carbon atoms thereon, although not particularly limited, is preferably from 2 to 10, and more preferably from 2 to 6.

Specific examples of the alkenyl groups include vinyl, allyl, butenyl, pentenyl and hexenyl groups. Of these, a vinyl group is preferred.

As mentioned above, in the organopolysiloxane represented by formula (1), at least 20 mol % of the occurrences of $R^1$ are methyl groups and from 0.1 to 50 mol % are alkenyl groups. The methyl group content is preferably from 20 to 99.9 mol %, more preferably from 40 to 97 mol %, and even more preferably from 60 to 95 mol %. The alkenyl group content is preferably from 0.1 to 40 mol %, more preferably from 0.1 to 30 mol %, and even more preferably from 0.3 to 20 mol %.

At a methyl group content below 20 mol %, the resulting cured material has an inadequate heat resistance. At an alkenyl group content below 0.1 mol %, the curability of the composition is inadequate; at an alkenyl group content greater than 50 mol %, the cured material is brittle.

It is most preferable for at least 80 mol % of the occurrences of $R^1$ to be methyl groups and for the balance to be vinyl groups.

In formula (1), $X^1$ is a hydrogen atom or an alkyl group.
This alkyl group is exemplified by the same groups as mentioned for $R^1$, although methyl and ethyl groups are especially preferred.

In formula (1), a1 is a number from 0.1 to 1, preferably from 0.15 to 0.9, and more preferably from 0.2 to 0.8. When a1 is less than 0.1 (the content of $(R^1SiO_{3/2})_{a1}$ units is less than 10 mol %), the mechanical properties such as the hardness after curing are inadequate.

Also, b1 is a number from 0 to 0.75, preferably from 0 to 0.5, and more preferably from 0 to 0.4;
c1 is a number from 0 to 0.1, and preferably from 0 to 0.5; and
a1+b1+c1 is 1.

Although the molecular weight of the organopolysiloxane of component (A) is not limited, the polystyrene-equivalent weight-average molecular weight (Mw), as measured by gel permeation chromatography (GPC) using tetrahydrofuran as the solvent, is preferably from 500 to 20,000, more preferably from 700 to 15,000, and even more preferably from 1,000 to 10,000.

The organopolysiloxane of component (A) may be of one type used alone, or two or more may be used in combination.
(2) Component (B)
Component (B) in the ultraviolet-curable silicone adhesive composition of the invention is a linear organopolysiloxane of average compositional formula (2) below.

$(R^2{}_3SiO_{1/2})_{a2}(R^2{}_2SiO)_{b2}$ (2)

In formula (2), each $R^2$ is independently a substituted or unsubstituted monovalent hydrocarbon group, with at least 20 mol % of the occurrences of $R^2$ being methyl groups and from 0.01 to 25 mol % being alkenyl groups.

The monovalent hydrocarbon group $R^2$ is exemplified by the same groups as mentioned above for $R^1$.

In the organopolysiloxane of formula (2), at least 20 mol % of the occurrences of $R^2$ are methyl groups and from 0.01 to 25 mol % are alkenyl groups. However, from the standpoint of, for example, the compatibility with component (A) and the properties of the cured material, the methyl group content is preferably from 20 to 99.9 mol %, more preferably from 40 to 97 mol %, even more preferably from 50 to 97 mol %, and still more preferably from 60 to 95 mol %. The alkenyl group content is preferably from 0.05 to 25 mol %, more preferably from 0.1 to 20 mol %, and even more preferably from 0.3 to 10 mol %.

At a methyl group content below 20 mol %, the heat resistance of the resulting cured material is inadequate. At an alkenyl group content below 0.01 mol %, the curability of the composition is inadequate; at more than 25 mol %, the cured material is brittle.

In formula (2), a2 is a number from 0.001 to 0.67, preferably from 0.002 to 0.10, and more preferably from 0.003 to 0.044;
b2 is a number from 0.33 to 0.999, preferably from 0.90 to 0.998, and more preferably from 0.956 to 0.997; and
a2+b2 is 1.

The organopolysiloxane of component (B) has a viscosity at 23° C. which is preferably from 1,000 to 50,000 mPa·s, and more preferably from 5,000 to 30,000 mPa·s. In this invention, the viscosity is a value measured using a rotational viscometer.

The content of the organopolysiloxane of component (B) per 100 parts by weight of component (A) is from 0 to 5,000 parts by weight, preferably from 10 to 3,000 parts by weight, and more preferably from 20 to 1,000 parts by weight. At a content in excess of 5,000 parts by weight, a sufficient hardness and strength are not obtained.

The organopolysiloxane of component (B) may be of one type used alone or two or more types may be used in combination.

(3) Component (C)

Component (C) in the ultraviolet-curable silicone adhesive composition of the invention is an organohydrogenpolysiloxane of average composition formula (3) below that has at least two, preferably at least three, Si—H groups per molecule.

$$R^3{}_d H_e SiO_{[(4-d-e)/2]} \quad (3)$$

In formula (3), each $R^3$ is independently a substituted or unsubstituted monovalent hydrocarbon group, exclusive of aliphatic unsaturated hydrocarbon groups.

The monovalent hydrocarbon group $R^3$ may be linear, branched or cyclic. The number of carbon atoms thereon, although not particularly limited, is preferably from 1 to 20, and more preferably from 1 to 10.

Specific examples of this monovalent hydrocarbon group include aliphatic saturated monovalent hydrocarbon groups such as methyl, ethyl, n-propyl, isopropyl, n-butyl, sec-butyl, tert-butyl, n-hexyl and other linear or branched alkyl groups, and cyclohexyl and other cycloalkyl groups; aromatic or aromatic group-containing monovalent hydrocarbon groups such as phenyl, tolyl groups and other aryl groups, and benzyl, phenylethyl and other aralkyl groups; halogen-substituted monovalent hydrocarbon groups such as the 3,3,3-trifluoropropyl group; and cyano-substituted monovalent hydrocarbon groups such as the cyanoethyl group. Of these, a methyl group is preferred.

In the organohydrogenpolysiloxane of component (C), from the standpoint of, for example, the compatibility with components (A) and (B) and the properties of the cured material, preferably at least 20 mol %, and more preferably at least 50 mol %, of the total number of $R^3$ and Si—H groups in component (C) are methyl groups.

In formula (3), is a number such that $0.7 \le d \le 2.5$, preferably $0.7 \le d \le 2.1$, and more preferably $1.0 \le d \le 1.8$. When is less than 0.7, there is a concern that foaming will occur during curing and the change in hardness over time tends to be large; at more than 2.5, sufficient hardness may not be obtained.

Also, 'e' is a positive number such that $0.01 \le e \le 1.0$, preferably $0.02 \le e \le 1.0$, and more preferably $0.1 \le e \le 1.0$. When 'e' is less than 0.01, sufficient hardness may not be obtained; at more than 1.0, there is a concern that foaming will occur during curing and the change in hardness over time tends to be large.

The sum d+e is such that $0.8 \le d+e \le 2.7$, preferably $1 \le d+e \le 2.4$, and more preferably $1.6 \le d+e \le 2.2$. When d+e is less than 0.8, the cured material tends to be hard and brittle, as a result of which cracks readily form in the laminate; when it exceeds 2.7, the cured material tends to be soft and does little to reinforce the laminate.

The organohydrogenpolysiloxane serving as component (C) has a viscosity at 23° C. which is preferably from 1 to 50 mPa·s, and more preferably from 2 to 20 mPa·s.

The content of the organohydrogenpolysiloxane serving as component (C) is an amount such that the molar ratio of the hydrosilyl groups included in component (C) to the alkenyl groups included in components (A) and (B), expressed as hydrosilyl/alkenyl, is from 0.5 to 2, and preferably an amount such that this ratio is from 1 to 1.5. At a hydrosilyl/alkenyl molar ratio of less than 0.5, the curability is inadequate; at more than 2, the adhesive properties are insufficient.

The organohydrogenpolysiloxane serving as component (C) may be of one type used alone, or two more types may be used in combination.

(4) Component (D)

Component (D) is a platinum metal catalyst which is activated by light having a wavelength of between 200 and 500 nm. That is, it is a catalyst that is inactive in the absence of light but, when irradiated with light having a wavelength between 200 and 500 nm, changes to a platinum-metal catalyst which is active at room temperature, promoting hydrosilylation reactions between the alkenyl groups in components (A) and (B) and the silicon-bonded hydrogen atoms in component (C).

Specific examples of this component (D) include ($\eta^5$-cyclopentadienyl)tri(aliphatic) platinum compounds and derivatives thereof. Of these, cyclopentadienyl(trimethyl)platinum, methylcyclopentadienyl(trimethyl)platinum and derivatives of these in which the cyclopentadienyl group has been modified are especially preferred.

Bis(β-diketonato)platinum compounds are also preferred examples of component (D). Of these, bis(acetylacetonato)platinum compounds and derivatives in which the acetylacetonato groups have been modified are especially preferred.

The content of the platinum metal catalyst serving component (D) is not limited so long as it is an amount that promotes curing (hydrosilylation reactions) of the composition. The amount is such that the weight of the metal atoms in this component with respect to the total weight of components (A) to (C) of the composition is preferably in the range of 0.01 to 500 ppm, more preferably in the range of 0.05 to 100 ppm, and even more preferably in the range of 0.01 to 50 ppm.

The platinum metal catalyst serving as component (D) may be of one type used alone, or two or more may be used in combination.

(5) Component (E)

An adhesive modifier may be optionally added as component (E) to the ultraviolet-curable silicone adhesive composition of the invention. Exemplary adhesive modifiers include organic compounds containing at least one functional moiety selected from the group consisting of (meth)acrylic, carbonyl, epoxy, alkoxysilyl and amide moieties per molecule.

Specific examples of adhesive modifiers containing an alkoxysilyl moiety include γ-(glycidoxypropyl)trimethoxysilane (trade name: KBM-403, from Shin-Etsu Chemical Co., Ltd.), γ-(methacryloxypropyl)trimethoxysilane (trade name: KBM-503, from Shin-Etsu Chemical Co., Ltd.), and hydrolytic condensation products of these.

Specific examples of compounds containing at least one type of functional moiety from the group mentioned above and having an organosiloxane skeleton include compounds of the following structural formulas.

[Chem. 1]

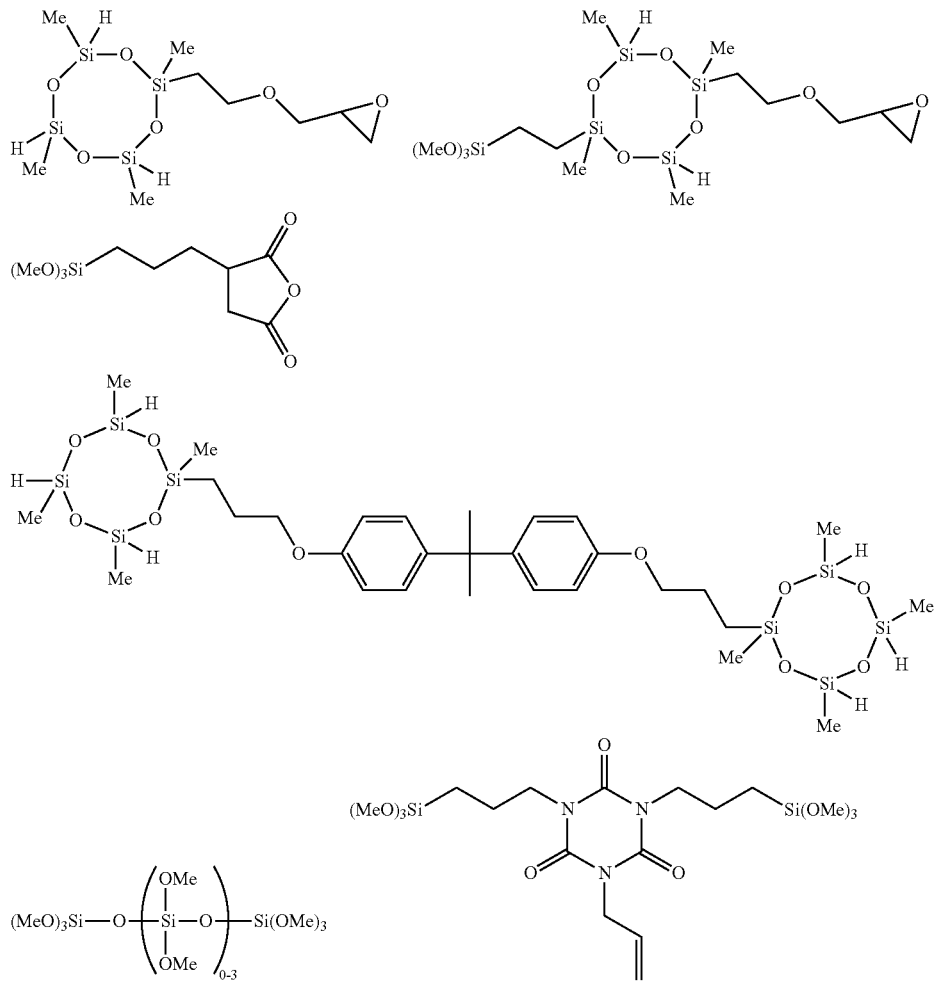

(wherein "Me" stands for a methyl group)

In addition, specific examples of adhesive modifiers that do not include an organosiloxane skeleton include allyl glycidyl ether, vinylcyclohexene monoxide, diethyl 2-allylmalonate, allyl benzoate, diallyl phthalate, tetraallyl pyromellitate and triallyl isocyanurate.

The amount of adhesive modifier added as component (E) is preferably from 0.05 to 10 parts by weight, and more preferably from 0.05 to 5 parts by weight, per 100 parts by weight of components (A) and (B) combined. At a component (E) content within this range, suitable adhesiveness can be imparted.

When component (E) is added, one such ingredient may be added alone or a plurality of two or more may be added together.

(6) Component (F)

A reaction regulator (F) may be optionally added to the ultraviolet-curable silicone adhesive composition of the invention in order to keep thickening or gelation from occurring prior to heat curing when preparing the composition or when coating the composition onto a substrate.

Specific examples of the reaction regulator include 3-methyl-1-butyn-3-ol, 3-methyl-1-pentyn-3-ol, 3,5-dimethyl-1-hexyn-3-ol, 1-ethynylcyclohexanol, ethynylmethyldecylcarbinol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane and 1,1,3,3-tetramethyl-1,3-divinyldisiloxane.

1-Ethynylcyclohexanol, ethynylmethyldecylcarbinol and 3-methyl-1-butyn-3-ol are preferred.

The component (F) content per 100 parts by weight of components (A) and (B) combined is preferably from 0.01 to 2 parts by weight, and more preferably from 0.01 to 0.1 part by weight. Within this range, a reaction-regulating effect is fully exhibited.

In addition to the above components (A) to (F), the ultraviolet-curable silicone adhesive composition of the invention may also include other ingredients such as those mentioned below, insofar as doing so does not detract from the object of the invention.

Examples of such other ingredients include thixotropy regulators such as fumed silica, reinforcing agents such as crystalline silica, antioxidants, light stabilizers, heat resistance enhancers such as metal oxides and metal hydroxides, colorants such as titanium oxide, thermal conductivity-imparting fillers such as alumina and crystalline silica, viscosity modifiers such as non-reactive silicone oils having no reactive functional groups, electrical conductivity-imparting agents such as silver, gold and other metal powders, and pigments and dyes for coloration.

The above-described ultraviolet-curable silicone adhesive composition of the invention can be suitably used as an adhesive layer-forming composition when laminating together, through an adhesive layer, two substrates that make up a laminated body such as an optical device or a display or touch panel.

The method for producing the laminated body includes a coating step, an ultraviolet irradiation step, a curing step and a lamination step. The respective steps may be carried out using, for example, the following methods.

(A) Coating Step

In the coating step, the adhesive composition of the invention is coated onto one of the substrates.

The coating method is not particularly limited. Examples include techniques that involve coating with a slit coater, dam-and-fill coating and fishbone coating.

The coating amount is preferably one that gives an adhesive layer thickness after curing of from 100 to 5,000 µm.

The substrate to which the ultraviolet-curable silicone adhesive composition of the invention is applied is exemplified by composite materials, metal members, plastic members and ceramic members. In particular, the composition may be applied to materials used in such fields as the covering, casting, adhesion and sealing of casings and members in electrical applications, electronic applications, and optical applications.

The adhesive composition of the invention can be used also on substrates that have been activated by a known pretreatment step such as primer treatment, plasma treatment or excimer light treatment.

(B) Ultraviolet Irradiation Step

In the ultraviolet irradiation step, the adhesive composition is irradiated with ultraviolet light.

The ultraviolet irradiation method used may be, for example, a method that utilizes a 365 nm UV-LED lamp, a metal halide lamp or the like as the ultraviolet source to irradiate a suitable amount of ultraviolet light.

Light having a wavelength of preferably between 200 and 500 nm, and more preferably between 200 and 350 nm, is used for ultraviolet irradiation.

At this time, from the standpoint of the rate of cure and preventing discoloration, the irradiation temperature is preferably between 20° C. and 80° C., the irradiation intensity is preferably from 30 to 2,000 mW/cm$^2$ and the irradiation dose is preferably from 150 to 10,000 mJ/cm$^2$.

(C) Curing Step

In the curing step, the ultraviolet-irradiated adhesive composition is cured.

The curing method may be, for example, a technique that forms an adhesive layer by leaving the ultraviolet-irradiated adhesive composition at rest in a predetermined environment and allowing it to cure.

The curing temperature of the ultraviolet-curable silicone adhesive composition of the invention is not particularly limited, although curing is preferably effected for a period of from 1 minute to 1 day in an open-air atmosphere at between 20° C. and 60° C.

(D) Lamination Step

In the lamination step, the other substrate is superimposed on the adhesive composition or adhesive layer to form a laminated body in which the two substrates are laminated together through the adhesive composition or adhesive layer.

The method of lamination may be, for example, one which sets (a) the adhesive layer/substrate laminate wherein the adhesive is in a liquid to semi-solid state after passing through the coating step, ultraviolet irradiation step and curing step, (b) the adhesive composition following the coating step, or (c) the adhesive composition/substrate laminate following the coating step and the ultraviolet irradiation step within a vacuum or atmospheric-pressure laminator, and then superimposes the other substrate on the adhesive composition or adhesive layer and laminates them together. In the case of (b) the adhesive composition following the coating step, the remaining steps are carried out to effect curing and form a laminated body.

To keep curing of the adhesive composition of the invention from being inhibited by oxygen and also to enable the curing time from when ultraviolet irradiation is carried out to be changed by the design of the adhesive composition or the heating temperature, the sequence of the coating step, ultraviolet irradiation step, curing step and lamination step may be freely selected and changed according to the structure of the device being manufacturing, such as a flat display or a curved display.

The inventive method for producing a laminated body is illustrated below by the production of a laminated body having a cover panel and an image display panel.

First, the ultraviolet-curable silicone adhesive composition of the invention is coated onto the image display panel. Next, using a UV-LED lamp having a wavelength peak at 365 nm, the adhesive composition is irradiated for 30 seconds at 23° C. with ultraviolet light in such a way that the irradiation intensity, based on 365-nm light, is 100 mW/cm$^2$ and the dose is 3,000 mJ/cm$^2$. The adhesive composition is then left at rest for 30 minutes in a 23° C. environment, allowing it to cure and thus form an adhesive layer. Using a vacuum laminator, the cover panel is then superimposed on the adhesive layer, enabling a laminated body in which the cover panel and the image display panel are laminated together through the adhesive layer to be obtained.

Alternatively, after the ultraviolet irradiation step, by using a vacuum laminator to first superimpose the cover panel on the adhesive composition, the image display panel and the cover panel are laminated together through the adhesive composition, after which the adhesive composition can be cured by leaving it at rest for 30 minutes in a 60° C. environment. Or, because the cover panel is transparent, following the coating step, vacuum lamination may be carried out, after which ultraviolet irradiation is carried out through the cover panel to effect the cure. Another possibility is to coat adhesive composition that has already been ultraviolet-irradiated onto the image display panel, carry out vacuum lamination with the cover panel, and allow curing to take place.

Examples

Examples and Comparative Examples are given below to more concretely illustrate the invention, although the invention is not limited by these Examples.

Component (A):

(A-1) A branched-chain organopolysiloxane represented by average unit formula (4) below (physical form: solid (25° C.); content of silicon-bonded vinyl groups among all silicon-bonded organic groups=4.0 mol %; content of silicon-bonded methyl groups among all silicon-bonded organic groups=96 mol %; polystyrene-equivalent weight-average molecular weight=13,000)

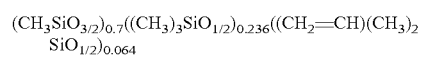

(4)

(A-2) A branched-chain organopolysiloxane represented by average unit formula (5) below (physical form: solid (25° C.); content of silicon-bonded vinyl groups among all silicon-bonded organic groups=7.4 mol %; content of silicon-bonded methyl groups among all silicon-bonded organic groups=92.6 mol %; polystyrene-equivalent weight-average molecular weight=3,600)

$$(SiO_2)_{0.55}[(CH_2=CH)(CH_3)_2SiO_{1/2}]_{0.1}((CH_3)_3SiO_{1/2})_{0.35} \quad (5)$$

Component (B):
(B-1) A dimethylpolysiloxane of formula (6) below which is capped at both ends of the molecular chain with dimethylvinylsiloxy groups and has a viscosity at 23° C. of 5,000 mPa·s $$((CH_2=CH)(CH_3)_2SiO_{1/2})_2((CH_3)_2SiO_{2/2})_{430} \quad (6)$$

(B-2) A dimethylpolysiloxane of formula (7) below which is capped at both ends of the molecular chain with dimethylvinylsiloxy groups and has a viscosity at 23° C. of 10,000 mPa·s $$((CH_2=CH)(CH_3)_2SiO_{1/2})_2((CH_3)_2SiO_{2/2})_{530} \quad (7)$$

(B-3) A dimethylpolysiloxane of formula (8) below which is capped at both ends of the molecular chain with dimethylvinylsiloxy groups and has a viscosity at 23° C. of 30,000 mPa·s $$((CH_2=CH)(CH_3)_2SiO_{1/2})_2((CH_3)_2SiO_{2/2})_{730} \quad (8)$$

Component (C):
(C-1) A dimethylsiloxane/methylhydrogensiloxane copolymer which is capped at both ends of the molecular chain with trimethylsiloxy groups and has a viscosity at 23° C. of 6.3 mPa·s (content of silicon-bonded hydrogen atoms=0.63 wt %)

Component (D):
(D-1) Toluene solution of trimethyl(methylcyclopentadienyl)platinum complex (platinum content, 0.5 wt %)
(D-2) Ethyl 2-(2-butoxyethoxy)ethyl acetate solution of platinum bis(acetylacetonate) complex (platinum content, 0.5 wt %)
(D-3) Dimethylsiloxane polymer solution of platinum 1,3-divinyl-1,1,3,3-tetramethyldisiloxane complex (platinum content, 1.0 wt %)

Component (E):
(E-1) Tetraallyl pyromellitate (TRIAM805, from FUJIFILM Wako Pure Chemical Corporation)
(E-2) Diallyl phthalate
(E-3) The cyclic siloxane compound of formula (9) below

[Chem. 2]

$$(9)$$

(E-4) The cyclic siloxane compound of formula (10) below

[Chem. 3]

$$(10)$$

(E-5) The siloxane compound of formula (11) below

[Chem. 4]

$$(MeO)_3Si-O\left(\begin{array}{c}OMe\\|\\Si-O\\|\\OMe\end{array}\right)_{0-3}Si(OMe)_3 \quad (11)$$

Component (F):
(F-1) Ethynylmethyldecylcarbinol
(Other Ingredients): Crystalline silica powder having an average particle size of 1.5 μm Examples 1 to 3, Comparative Examples 1 to 4

Silicone adhesive compositions were prepared by mixing together the above ingredients in the amounts (parts by weight) shown in Table 1.

TABLE 1

| | | Example | | | Comparative Example | | | |
|---|---|---|---|---|---|---|---|---|
| | | 1 | 2 | 3 | 1 | 2 | 3 | 4 |
| Component (A) | A-1 | 40 | 40 | 40 | | | 40 | 40 |
| | A-2 | | | | 40 | 40 | | |
| Component (B) | B-1 | 10 | 10 | 10 | 40 | 40 | 10 | 10 |
| | B-2 | 30 | 30 | 30 | 30 | 30 | 30 | 30 |
| | B-3 | 30 | 30 | 30 | | | 30 | 30 |
| Component (C) | C-1 | 6.2 | 6.2 | 6.2 | 7.2 | 7.2 | 12 | 6.2 |
| Component (D) | D-1 | 0.7 | | 0.7 | 0.7 | | 0.7 | |
| | D-2 | | 0.7 | | | 0.7 | | |
| | D-3 | | | | | | | 0.35 |
| Component (E) | E-1 | 0.5 | 0.5 | | 0.5 | 0.5 | 0.5 | 0.5 |
| | E-2 | | | 0.5 | | | | |
| | E-3 | 0.5 | 0.5 | | 0.5 | 0.5 | 0.5 | 0.5 |
| | E-4 | | | 0.5 | | | | |
| | E-5 | 1.0 | 1.0 | 1.0 | 1.0 | 1.0 | 1.0 | 1.0 |
| Component (F) | F-1 | 0.01 | 0.01 | 0.01 | 0.01 | 0.01 | 0.01 | 0.3 |
| Others | Silica | 10 | 10 | 10 | 10 | 10 | 10 | 10 |
| SiH/alkenyl groups | | 1.1 | 1.1 | 1.4 | 1.1 | 1.1 | 2.1 | 1.1 |

The following tests were performed on the silicone adhesive compositions prepared in the Examples and Comparative Examples. Those results are presented in Table 2.

(1) Hardness
The silicone adhesive compositions prepared in the respective Examples and Comparative Examples were poured into glass Petri dishes and, using a UV-LED lamp having a peak wavelength of 365 nm, each composition was irradiated with ultraviolet light at 23° C. in such a way that, based on 365-nm light, the irradiation intensity was 100 mW/cm² and the dose was 1,500 mJ/cm². Following the completion of irradiation, the composition was left to stand for 24 hours at 23° C. in an open-air atmosphere, allowing it to cure.

The hardnesses of the resulting cured materials were measured with a JIS durometer (Type 00 durometer).
(2) Tensile Strength, Elongation at Break The tensile strength and elongation at break of the cured material were measured by methods based on JIS K 6249 using a Strograph (Toyo Seiki Seisaku-sho, Ltd.).
(3) Adhesion Test Using plates made of aluminum (Al), polyphenylene sulfide resin (PPS), polybutylene terephthalate resin (PBT) or glass as the substrates serving as the adherends, the adhesive compositions were coated onto one side of a first adherend. Using a UV-LED lamp having a peak wavelength of 365 nm, each composition was irradiated with ultraviolet light in such a way that, based on 365-nm light, the irradiation intensity was 100 mW/cm² and the dose was 3,000 mJ/cm². The other adherend was immediately placed on top of the composition, which was then cured at 60° C. for 30 minutes, thereby fabricating a shear adhesion test specimen in which the adhesive layer measured 25×10×1 mm³. This was allowed to cool to 23° C. A tensile test was then carried out using an Autograph (Shimadzu Corporation) by a method based on JIS K 6249, and the condition of the rupture surface following the test was examined.

(B) a linear organopolysiloxane represented by average unit formula (2) below $$(R^2_3SiO_{1/2})_{a2}(R^2_2SiO)_{b2} \quad (2)$$

each $R^2$ is independently a substituted or unsubstituted monovalent hydrocarbon group, with at least 20 mol % of the occurrences of $R^2$ being methyl groups and from 0.01 to 25 mol % being alkenyl groups; a2 is a number from 0.001 to 0.67, b2 is a number from 0.33 to 0.999; and a2+b2=1 in an amount of from 0 to 5,000 parts by weight per 100 parts by weight of component (A);

(C) an organohydrogenpolysiloxane of average compositional formula (3) below that has at least two Si—H groups per molecule $$R^3_d H_e SiO_{[(4-d-e)/2]} \quad (3)$$

wherein each $R^3$ is independently a substituted or unsubstituted monovalent hydrocarbon group exclusive of aliphatic unsaturated hydrocarbon groups, and 'd' and 'e' are numbers which satisfy the conditions $0.7 \le d \le 2.5$, $0.01 \le e \le 1.0$ and $0.8 \le d+e \le 2.7$ in an amount such that the molar ratio of hydrosilyl groups included in component (C) to alkenyl groups included in components (A) and (B), expressed as hydrosilyl/alkenyl, is from 0.8 to 2.0; and (D) a platinum metal catalyst that is activated by light having a wavelength of between 200 and 500 nm.

TABLE 2

|  | Example | | | Comparative Example | | | |
| --- | --- | --- | --- | --- | --- | --- | --- |
|  | 1 | 2 | 3 | 1 | 2 | 3 | 4 |
| Hardness (Shore OO) | 35 | 34 | 37 | 46 | 44 | 41 | did not cure |
| Tensile strength (MPa) | 3.7 | 3.3 | 3.7 | 6.2 | 6.0 | 4.5 | did not cure |
| Elongation at break (%) | 210 | 190 | 160 | 420 | 400 | 150 | did not cure |
| Adhesion test Al/Al | cohesive failure | cohesive failure | cohesive failure | delamination | delamination | delamination | did not cure |
| PPS/PPS | cohesive failure | cohesive failure | cohesivefailure | delamination | delamination | delamination | did not cure |
| PBT/PBT | cohesive failure | cohesive failure | cohesive failure | delamination | delamination | delamination | did not cure |
| Glass/glass | cohesive failure | cohesive failure | cohesive failure | delamination | delamination | delamination | did not cure |

As is apparent from the results shown in Table 2, the ultraviolet-curable silicone adhesive compositions of Examples 1 to 3 provide cured materials having an excellent adhesive strength.

On the other hand, the adhesive strength was inadequate in Comparative Examples 1 and 2 which do not use component (A) of the invention, and also in Comparative Example 3 in which the hydrosilyl/alkenyl molar ratio exceeds the range of the invention.

In Comparative Example 4 which does not use component (D) of the invention, it is apparent that curing has not occurred.

The invention claimed is:

1. An ultraviolet-curable silicone composition comprising:

(A) a branched organopolysiloxane represented by average unit formula (1) below $$(R^1SiO_{3/2})_{a1}(R^1_3SiO_{1/2})_{b1}(X^1O_{1/2})_{c1} \quad (1)$$

wherein each $R^1$ is independently a substituted or unsubstituted monovalent hydrocarbon group, with at least 80 mol % of the occurrences of $R^1$ being methyl groups and the balance being vinyl groups; $X^1$ is a hydrogen atom or an alkyl group, a1 is a number from 0.1 to 1, b1 is a number from 0 to 0.75, c1 is a number from 0 to 0.1, and a1+b1+c1=1;

2. The ultraviolet-curable silicone composition of claim 1, wherein $R^1$ is a monovalent hydrocarbon group of 1 to 3 carbon atoms.

3. The ultraviolet-curable silicone adhesive composition of claim 1, wherein component (D) is an ($\eta^5$-cyclopentadienyl)tri(aliphatic)platinum compound or a bis(β-diketonato)platinum compound.

4. The ultraviolet-curable silicone adhesive composition of claim 1, further comprising (E) a compound having at least one moiety selected from the group consisting of (meth)acrylic, carbonyl, epoxy, alkoxysilyl and amide moieties per molecule.

5. A method for producing a laminated body which has a first substrate, a second substrate superimposed on the first substrate and an intervening adhesive layer obtained using the adhesive composition of claim 1, which method comprises the steps of:

coating the adhesive composition onto a surface of the first substrate;

irradiating the adhesive composition with ultraviolet light;

curing the adhesive composition to form an adhesive layer; and superimposing the second substrate on the adhesive composition or adhesive layer and laminating together the first and second substrates through the adhesive composition or adhesive layer.

* * * * *